United States Patent [19]

Horchler, Jr. et al.

[11] Patent Number: 5,595,055

[45] Date of Patent: Jan. 21, 1997

[54] PICKUP APPARATUS FOR A ROUND BALER

[75] Inventors: Fred M. Horchler, Jr., Lancaster; H. Nevin Lausch, Denver, both of Pa.

[73] Assignee: New Holland North America, Inc., New Holland, Pa.

[21] Appl. No.: 503,361

[22] Filed: Jul. 17, 1995

[51] Int. Cl.$^6$ ............................................. A01F 15/07
[52] U.S. Cl. ............................................ 56/341; 100/88
[58] Field of Search ........................... 56/341, 432, 474; 100/88

[56] References Cited

U.S. PATENT DOCUMENTS

| | | | |
|---|---|---|---|
| 4,104,853 | 8/1978 | Howard et al. | 56/341 |
| 4,157,643 | 6/1979 | White | 56/341 |
| 4,510,741 | 4/1985 | Campbell et al. | 56/341 |
| 4,579,052 | 4/1986 | Schaible | 100/5 |
| 4,662,275 | 5/1987 | Tertilt | 100/89 |
| 4,955,188 | 9/1990 | von Allworden | 56/341 |
| 4,956,968 | 9/1990 | Underhill | 56/341 |
| 5,044,272 | 9/1991 | Jennings | 100/89 |
| 5,092,114 | 3/1992 | Eggenmueller | 56/341 |

FOREIGN PATENT DOCUMENTS 3719845  12/1988  Germany ............................. 56/341

OTHER PUBLICATIONS

1993 New Holland Round Baler 640, 650, 660 Operator's Manual No. 42065032.

Primary Examiner—Terry Lee Melius
Attorney, Agent, or Firm—Frank A. Seemar; Larry W. Miller; John William Stader

[57] ABSTRACT

Improved pickup apparatus for a round baler for traversing a field to form cylindrical bales of crop material. The baler comprises a main frame having a bale forming chamber thereon with a generally transverse opening for permitting the ingress of crop material. The chamber includes a floor roll for supporting the bale as it is being formed, which floor roll includes conveying means disposed to engage the crop material after it has passed through the transverse opening. An improved pickup is provided for picking up crop material from the field and feeding it rearwardly along a path in the direction of the transverse opening. Also included in the pickup is a stuffer mechanism comprising crop engaging elements for engaging the crop material as it is being fed rearwardly and urging it along the path and into the transverse opening. The stuffer includes a striping function for engaging the crop material and stripping some or all of it from the crop engaging elements in the vicinity of the transverse opening. Unique supplemental stripping elements subsequently engage any of the crop material not stripped from the crop engaging elements by the stripper. Additionally, the supplemental stripping elements are configured to guide the subsequently engaged material to the bale forming chamber.

16 Claims, 4 Drawing Sheets

PICKUP APPARATUS FOR A ROUND BALER

FIELD OF THE INVENTION

This invention, relating generally to a baler for forming cylindrical bales of crop material, commonly referred to as a round baler, is directed to improved pickup apparatus for a round baler. More particularly, this invention is concerned with an improvement to round baler pickups having an intermediate stuffer mechanism.

BACKGROUND OF THE INVENTION

Prior art round balers generally have a bale forming chamber defined by an apron comprising an array of side-by-side belts, transverse slats extending between chains, a plurality of bale forming rolls or a combination of these various elements, e.g., bale forming rolls and side-by-side belts. The utilization of rolls in combination with belts is shown by way of example in the round baler of U. S. Pat. No. 5,044,272, issued Sep. 3, 1991 in the name of Richard E. Jennings.

During field operation, a pickup assembly picks up crop material, such as hay, from the ground and feeds it into a fixed or adjustable chamber where it is rolled up to form a compact cylindrical package of hay. While still inside the chamber the formed package is wrapped in its compact form by net, twine, or the like, prior to being ejected as a bale onto the ground for subsequent handling.

Round balers having chambers of the various configurations mentioned above commonly have a pickup with a set of tines that engage a windrow of crop material on the ground and lift it upwardly and then urge it rearwardly along a continuous path from the ground to the chamber. In certain configurations of pickups the tines disengage from the crop material and other feed assist means such as fingers engage the material to urge it rearwardly toward the chamber to assure continuous and smooth flow. Feed assist arrangements such as this are commonly referred to as stuffers in that they actually serve the purpose of stuffing crop material into the chamber. For example, U.S. Pat. No. 4,662,275, issued May 5, 1987 in the name of Werner Tertilt, shows a round baler having a conveyor between the pickup and the baling chamber. The conveyor comprise a series of prongs extending upwardly through accommodating slits in a metal tray. U.S. Pat. No. 4,579,052, issued Apr. 1, 1986 in the name of Siegfried Schaible discloses a similar system in which the prongs extend downwardly. U.S. Pat. No. 4,510,741, issued Apr. 16, 1985 in the name of Hallis D. Campbell, et al, shows another arrangement in which the pickup on a round baler does not feed material directly to the bale forming chamber. In this patent a standard pickup conveys crop material rearwardly to the nip between a pair of feed rollers which in turn continue it along its rearward path.

In some round balers, stub augers extend from opposing sides downstream from the pickup to reduce the width of the mat of crop material being fed to the chamber. In arrangement of this type it is common to provide the floor area between the pickup and the chamber with feed assist mechanisms. A good example of an arrangement of this type is shown on pages 2-1 through 2-3, taken from New Holland Operator's Manual No. 42064032 for round baler models 640, 650 and 660, issued in August, 1993. Because of the proximity of the stuffer fingers to the baling chamber it is important that random material is not permitted to build up in the vicinity of the chamber ingress when the fingers are retracted from the feed path. In the past, to guard against this undesirable buildup, a shield has been used, as shown in FIG. 2-7 on page 2-3. Unfortunately, under some crop conditions thorough stripping is not always achieved giving rise to accumulation on the shield which reduces effectiveness of the pickup by preventing smooth and uniform flow.

SUMMARY OF THE INVENTION

An important object of the present invention is to provide improved round baler pickup apparatus which overcomes the problem caused by the buildup of material under conditions where stuffer fingers are employed in the path of crop material between the point where it is picked up from the ground and the ingress to the chamber.

In pursuance of this and other important objects the present invention provides an improved pickup for round balers adapted to traverse a field to form cylindrical bales of crop material. The baler comprises a main frame, means for supporting the frame above the surface of the field, and a bale forming chamber defined by a floor roll and means mounted on the frame, which chamber has a generally transverse opening for permitting the ingress of crop material. The baler further comprises a pickup for picking up crop material from the field and feeding it rearwardly along a path in the direction of the transverse opening, and stuffer means that include crop engaging elements for engaging the crop material as it is being fed rearwardly, the elements being operative to urge the crop material along the path and into the transverse opening. The stuffer means includes stripping means for engaging the crop material and stripping some or all of the crop material from the crop engaging elements in the vicinity of the transverse opening.

According to the broadest aspects of the present invention, unique supplemental stripping means subsequently engage any of the crop material not stripped from the crop engaging means by the stripping means. More specifically, another important aspect of the present invention contemplates a round baler in which the chamber includes a floor roll and supplemental stripping means of the above nature which has means for guiding subsequently engaged material to conveying means on the floor roll.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
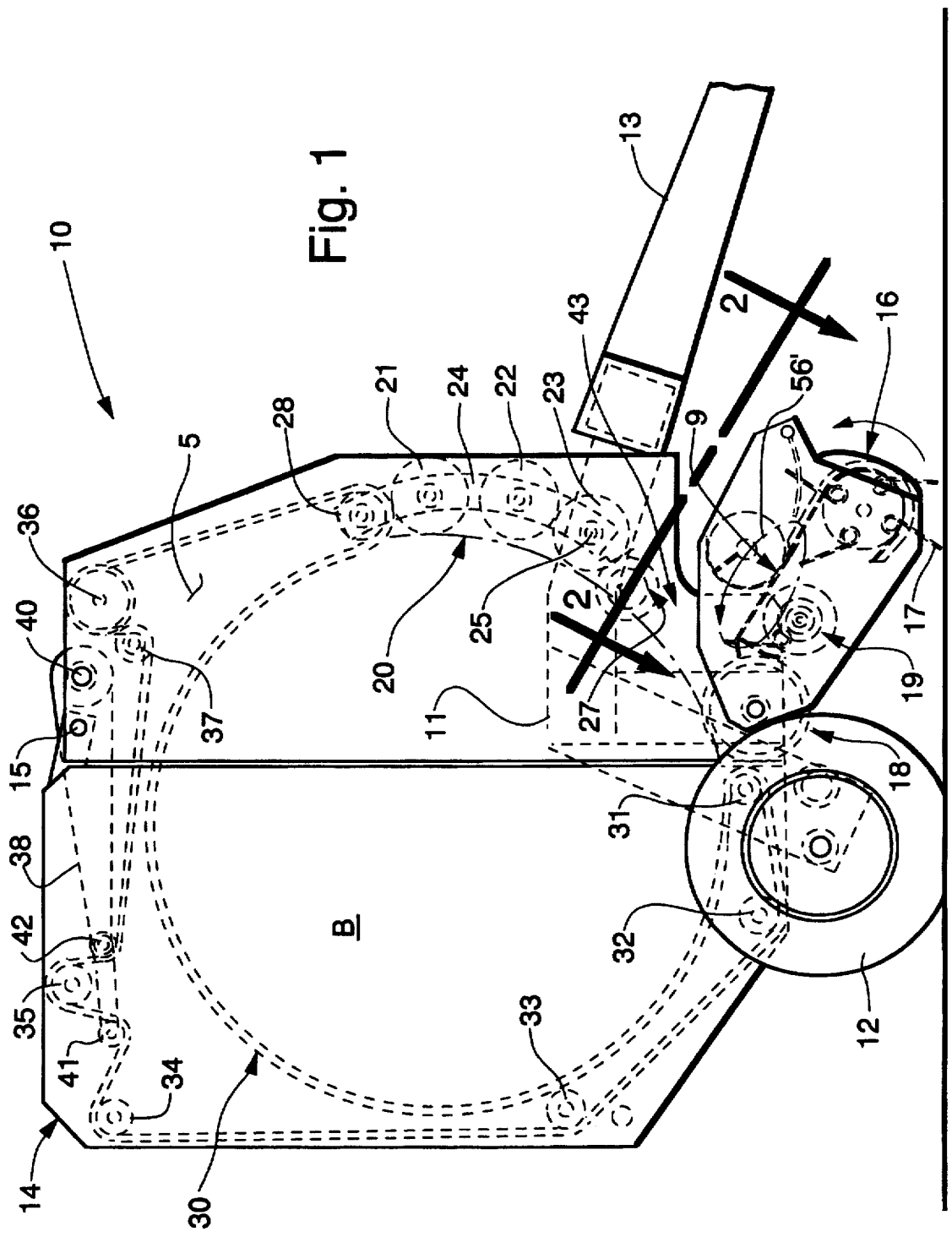
FIG. 1 is a side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,956,968 issued on Sep. 18, 1990 in the name of Kenneth R. Underhill. Baler 10 includes a main frame 11 supported by a pair of wheels 12 (only one shown), a tongue 13 on the forward portion of main frame 11 for connection to a tractor, and a tailgate 14 pivotally connected to main frame 11 by stub shafts 15 so that tailgate 14 may be closed as shown in FIG. 1 during bale formation and wrapping or opened to discharge a completed bale. Pickup apparatus, generally comprising a pickup 16 and a stuffer 19, is mounted on main frame 11.

Pickup 16 includes a plurality of fingers or tines 17 movable along a predetermined path to lift crop material from the ground and deliver it along feed table 9 toward a floor roll 18 which is rotatably mounted on main frame 11. Opposing augers 7, 8 (see FIG. 2) mounted rearwardly of pickup 16, are operatively associated with stuffer 19 as discussed below.

The baler depicted in FIG. 1 shows a sledge assembly 20 having a plurality of rollers 21, 22, 23 extending transversely of main frame 11 in an arcuate array common to the type baler described in U.S. Pat. No. 4,956,968, mentioned above.

Rollers 21, 22, 23 are journalled at the ends thereof in a pair of spaced apart arms 24 (only one shown) pivotally mounted between sidewall 5, 6 of main frame 11 on stub shafts 25 for permitting pivotal movement of the sledge between a bale starting position (shown in U.S. Pat. No. 4,956,968) and the full bale position shown in FIG. 1. Rollers 21, 22, 23 are driven in a counter clockwise direction (as viewed in FIG. 1) by conventional means connected to a PTO (power take off) of a tractor (not shown). A starter roll 27 is located adjacent roller 23 and is also driven in a counter clockwise direction to strip crop material from roller 23. A freely rotatable idler roller 28 is also mounted on arms 24 for movement with sledge assembly 20.

An apron, generally referred to by reference numeral 30, includes a plurality of continuous flat side by side belts supported by guide rolls 31, 32, 33, 34, 35, rotatably mounted in tailgate 14. Apron 30 is also supported on a drive roll 36 rotatably mounted on main frame 11. Although apron 30 passes between roller 21 and idler roller 28, it is only in engagement with idler roller 28. Roller 21 is located in close proximity to apron 30 to strip crop material from its belts, as referred to above. Conventional means (not shown) provide rotation of drive roll 36 in a direction causing movement of apron 30 along the path indicated in broken lines in FIG. 1. An additional guide roll 37 in main frame 11 ensures proper driving engagement between apron 30 and drive roll 36. A pair of take up arms 38 (one shown) are pivotally mounted on main frame 11 by a cross shaft 40 for movement between varying inner and fixed outer positions, corresponding to bale forming and full bale conditions, respectively. The full bale position shown in FIG. 1 will suffice for the proposes of the description of this invention. Further, it should be noted that take up arms 38 carry additional guide rolls 41, 42 for supporting apron 30. Resilient means (not shown) are provided to normally urge take up arms 38 toward their inner positions while resisting movement thereof from their inner positions to their outer positions to keep tension on the roll forming belts in a known manner.

As baler 10 is towed across a field by a tractor, pick up tines 17 lift crop material, usually in a windrow, from the ground and deliver it to augers 7, 8 which converge the material and urge it to feed table 9 where stuffer 19 engages the material and feeds it rearwardly into the bale forming chamber through transverse infeed opening 43, commonly referred to as the throat, which in the baler shown is defined by floor roll 18 and starter roll 27. The crop material fed through throat 43 is continuously coiled in a clockwise direction until the inner courses of apron 30 expand to the position shown in FIG. 1. This formation of a cylindrical package takes place in a well known manner, after which the package is wrapped, tailgate 14 is opened, the bale B is discharged rearwardly, tail gate 14 is closed and the baler is again ready to form another bale.

Figure 2:
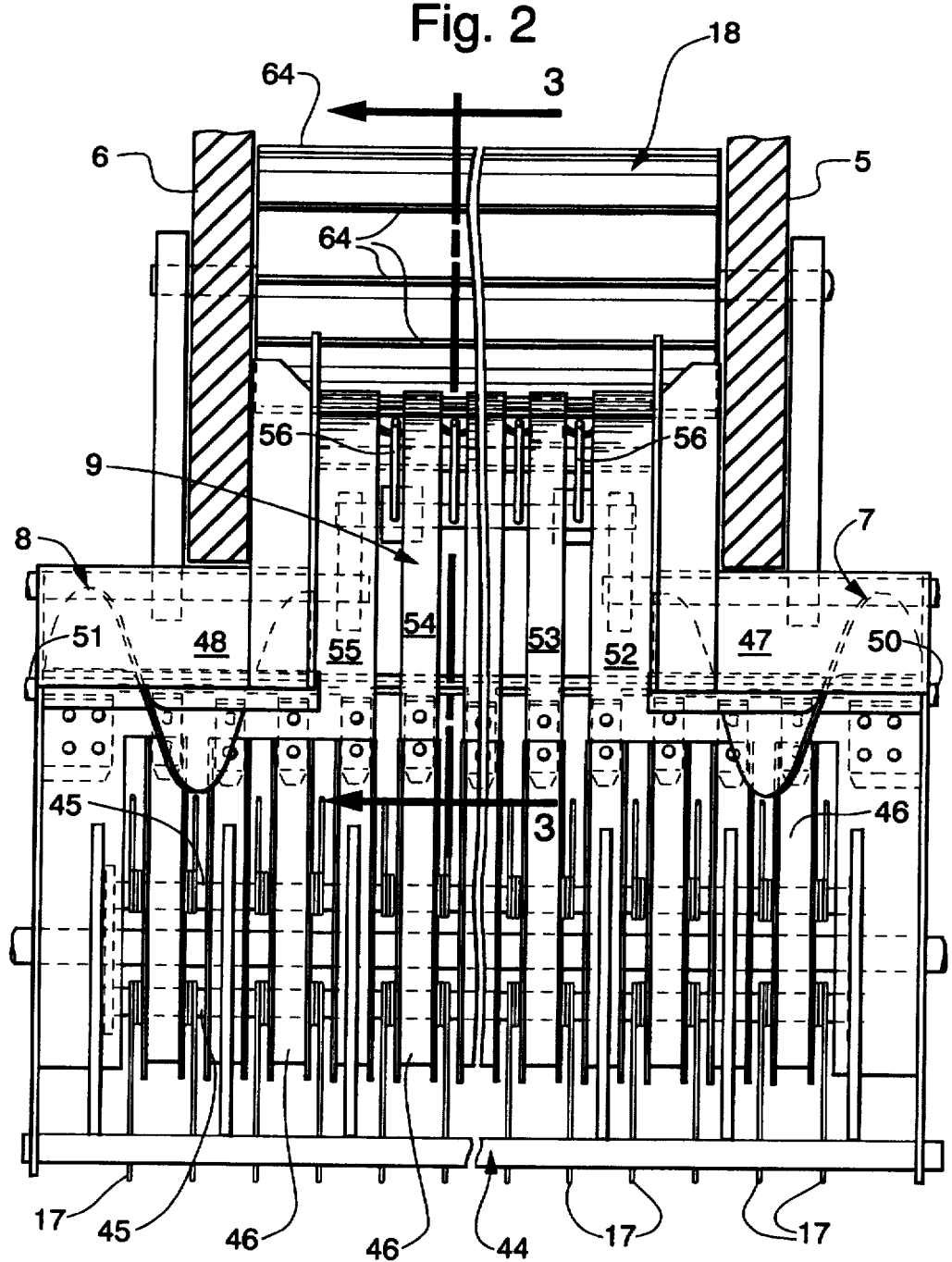
FIG. 2 is a view taken in the direction of arrows 2—2 in FIG. 1.
Figure 3:
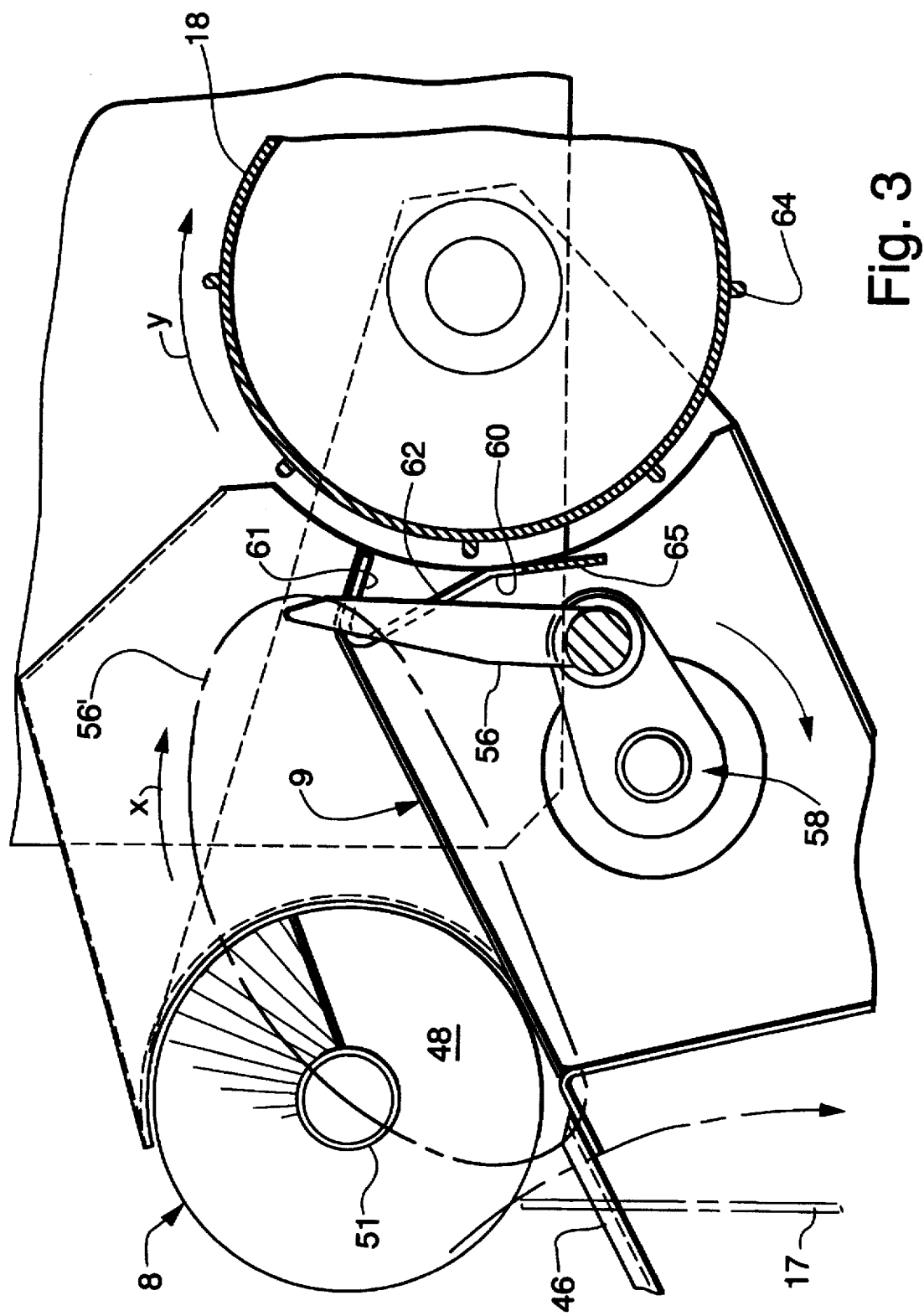
FIG. 3 is a view taken in the direction of arrows 3—3 in FIG. 2.

Now turning to FIGS. 2 and 3 where the pickup apparatus of the present invention is shown in further detail in its preferred embodiment as adapted to the structure of the above described round baler. It should be noted that it is not intended that its use be limited to balers of this nature, but that the present invention is adaptable for use on most if not all current round balers. Pickup 16 comprises conventional wind guard 44 and a plurality of tine sets, e.g., tines 17, mounted on corresponding tine bars 45 adapted to rotate them through a path whereby the tine tips sweep material off the ground and feed it upwardly and then rearwardly along and above the surface of elements 46, all of which is known in the prior art. Also known is the use of augers 7, 8 having flighting 47, 48 extending from rotatable tubes 50, 51 to urge material inwardly and thereby reduce the width of the mat of material being conveyed to feed table 9, as such material is concurrently being fed rearwardly by tines 17. Feed table 9 comprises a series of side by side elements 52, 53, 54, 55, extending in the direction of travel side to side and providing a plurality of longitudinal openings.

Stuffer 19, contiguous with pickup 16 and disposed between and generally rearwardly of augers 7, 8, comprises a plurality of side by side fingers 56, the tips of which are driven in direction x along a continuous loop path identified by reference numeral 56'. Part of the path which extends above table 9 and the remainder below. Fingers 56 are affixed to mounting bar 57 which is coupled to a conventional drive assembly 58 to provide the desired path 56' of fingers 56.

Figure 4:
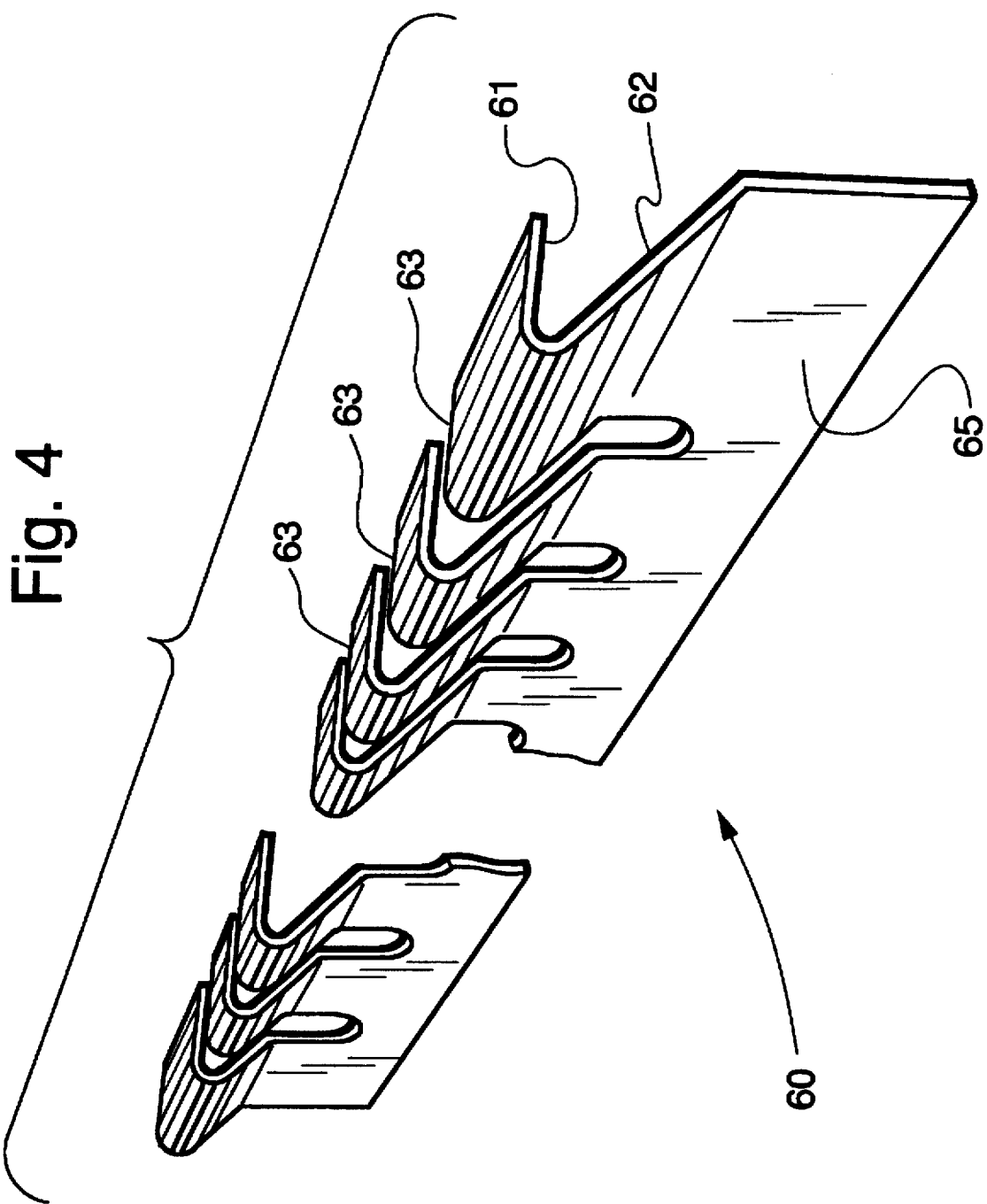
FIG. 4 is a perspective view depicting the unique configuration of the supplemental stripper element of the present invention.

As the fingers pass from the portion of path 56' above table 9 to the portion below the table, they pass in close proximity to the edges of adjacent elements, e.g., 52, 53, and in so doing crop material is stripped therefrom and presented to feedroll 18. Unique support element 60, shown separately in FIG. 4 for illustrative purposes, supports the ends of elements 52, 53, 54, 55 via slotted top portion 61. Element 60 further comprises downwardly extending flat portion 65 and intermediate slotted portion 62. It should be noted that element 60 includes a plurality of slots 63, the part of which is in top portion 61 corresponds to like slots, i.e., longitudinal openings, defined in table 9 by pairs of adjacent elements such as 52, 53 or 54, 55.

At the heart of the present invention is the novel configuration of support element 60 for providing, in addition to structural support, the function of supplemental stripping. When fingers 56 are not completely stripped by the floor elements under certain crop conditions, problems are encountered. In this regard, the intermediate slotted portions 62 provide supplemental stripping as the path of the tips pass therethrough, subsequent to passing through the floor. This supplementally stripped material is deposited on the top of the intermediate portion 62 of support element 60 and gravitates downwardly and rearwardly to the general vicinity of the surface of floor roll 18, whereupon the aggressive surface, comprising ribs 64, or the like, convey or assist in conveying the material in direction y to be included in the baling process.

In summary, the pickup apparatus described herein operates in a fashion whereby material is picked up, converged and fed rearwardly to a stuffer. The stuffer fingers that feed material to the baling chamber through an infeed opening are stripped as they pass through the stuffer feed table on their return, after which supplemental stripping is accomplished by elements below the feed table that function to both support the end of the table adjacent a floor roll, as well as strip material still engaged by the fingers after preliminary stripping. Additionally, material so stripped is guided to the feed roll via such supplemental stripping structure.

Included in the many advantages, explicit and implicit, of the novel apparatus of the present invention is the capability to provide a round baler with pickup apparatus that provides smooth and uniform flow of crop material to the baling chamber under many diverse conditions.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a round baler for traversing a field to form cylindrical bales of crop material, said baler comprising a main frame, means for supporting said frame above the surface of said field, a bale forming chamber defined by means mounted on said frame, said chamber having a generally transverse opening for permitting the ingress of crop material, a pickup for picking up crop material from said field and feeding it rearwardly along a path in the direction of said transverse opening, stuffer means including crop engaging elements for engaging said crop material as it is being fed rearwardly, said elements urge said crop material along said path and into said transverse opening, said stuffer means includes stationary stripping means for engaging said crop material and stripping some or all of said crop material from said crop engaging elements in the vicinity of said transverse opening, the improvement comprising supplemental stripping means for subsequently engaging any of said crop material not stripped from said crop engaging elements by said stripping means.

2. In a round baler as set forth in claim 1 wherein said stuffer means includes a floor over which said crop material is fed rearwardly, said floor including a plurality of longitudinal openings, and said crop engaging elements extending through said openings to engage said crop material.

3. In a round baler as set forth in claim 2 wherein said crop engaging elements comprise a plurality of side-by-side fingers having tips traveling along a continuous path, which path includes an upper portion above said floor.

4. In a round baler as set forth in claim 3 wherein said continuous path of tips of said fingers further comprises a lower portion below said floor, whereby said fingers pass in close proximity to the respective edges of said longitudinal openings under conditions where said tips are traveling from said upper portion of said path to said lower portion causing said material to be stripped from said fingers.

5. In a round baler for traversing a field to form cylindrical bales of crop material, said baler comprising a main frame, means for supporting said frame above the surface of said field, a bale forming chamber defined by means mounted on said frame, said chamber having a generally transverse opening for permitting the ingress of crop material, a pickup for picking up crop material from said field and feeding it rearwardly along a path in the direction of said transverse opening, stuffer means including crop engaging elements for engaging said crop material as it is being fed rearwardly, said elements urge said crop material along said path and into said transverse opening, said stuffer means includes stripping means for engaging said crop material and stripping some or all of said crop material from said crop engaging elements in the vicinity of said transverse opening, and a floor over which said crop material is fed rearwardly, said floor including a plurality of longitudinal openings, and said crop engaging elements extend through said openings to engage said crop material, said crop engaging elements comprise a plurality of side-by-side fingers having tips traveling along a continuous path, which path includes an upper portion above said floor and a lower portion below said floor, whereby said fingers pass in close proximity to the respective edges of said longitudinal openings under conditions where said tips are traveling from said upper portion of said path to said lower portion causing said material to be stripped from said fingers, the improvement comprising supplemental stripping means for subsequently engaging any of said crop material not stripped from said crop engaging elements by said stripping means, said supplemental stripper means extends transversely below said floor in the vicinity of said transverse opening.

6. In a round baler as set forth in claim 5 wherein said floor includes an end portion adjacent said transverse opening, and said supplemental stripping means is affixed to said end portion to provide support for said floor.

7. In a round baler as set forth in claim 5 wherein said supplemental stripping means includes a like plurality of longitudinal openings and said fingers pass in close proximity to the edge of said like plurality of longitudinal openings under conditions where said tips have previously traveled through said floor from said upper portion of said path to said lower portion causing said material not stripped from said fingers by said stripping means to be stripped therefrom by said supplemental stripping means.

8. In a round baler for traversing a field to form cylindrical bales of crop material, said baler comprising a main frame, means for supporting said frame above the surface of said field, a bale forming chamber defined by forming means mounted on said frame, said chamber having a generally transverse opening for permitting the ingress of crop material, said forming means including a floor roll for supporting the bale as it is being formed, said floor roll including conveying means disposed to receive said crop material after it has passed through said transverse opening and convey it away therefrom, a pickup for picking up crop material from said field and feeding it rearwardly along a path in the direction of said transverse opening, stuffer means including crop engaging elements for engaging said crop material as it is being fed rearwardly, said elements urge said crop material along said path and into said transverse opening, said stuffer means includes stationary stripping means for engaging said crop material and stripping some or all of said crop material from said crop engaging elements in the vicinity of said transverse opening, the improvement comprising supplemental stripping means for subsequently engaging any of said crop material not stripped from said crop engaging elements by said stripping means, said supplemental stripping means including means for guiding said subsequently engaged material to said conveying means on said floor roll.

9. In a round baler as set forth in claim 8 wherein said stuffer means includes a floor over which said crop material is fed rearwardly, said floor including a plurality of longitudinal openings, and said crop engaging elements extending through said openings to engage said crop material.

10. In a round baler as set forth in claim 9 wherein said crop engaging elements comprise a plurality of side-by-side fingers having tips traveling along a continuous path, which path includes an upper portion above said floor.

11. In a round baler as set forth in claim 10 wherein said continuous path of tips of said fingers further comprises a lower portion below said floor, whereby fingers pass in close proximity to the edge of said longitudinal openings under conditions where said tips are traveling from said upper portion of said path to said lower portion causing said material to be stripped from said fingers.

12. In a round baler as set forth in claim 8 wherein said means for guiding comprises an integral portion that terminates in the close proximity of said floor roll, whereby stripped material is guided to said roll and engaged by said conveying means.

13. In a round baler as set forth in claim 12 wherein said integral portion is inclined downwardly and rearwardly.

14. In a round baler for traversing a field to form cylindrical bales of crop material, said baler comprising a main frame, means for supporting said frame above the surface of said field, a bale forming chamber defined by forming means mounted on said frame, said chamber having a generally transverse opening for permitting the ingress of crop material, said forming means including a floor roll for supporting the bale as it is being formed, said floor roll including conveying means disposed to receive said crop material after it has passed through said transverse opening and convey it away therefrom, a pickup for picking up crop material from said field and feeding it rearwardly along a path in the direction of said transverse opening, stuffer means including crop engaging elements for engaging said crop material as it is being fed rearwardly, said elements urge said crop material along said path and into said transverse opening, said stuffer means includes stripping means for engaging said crop material and stripping some or all of said crop material from said crop engaging elements in the vicinity of said transverse opening, and a floor over which said crop material is fed rearwardly, said floor including a plurality of longitudinal openings, and said crop engaging elements extend through said openings to engage said crop material, said crop engaging elements comprise a plurality of side-by-side fingers having tips traveling along a continuous path, which path includes an upper portion above said floor and a lower portion below said floor, whereby said fingers pass in close proximity to the respective edges of said longitudinal openings under conditions where said tips are traveling from said upper portion of said path to said lower portion causing said material to be stripped from said fingers, the improvement comprising supplemental stripping means for subsequently engaging any of said crop material not stripped from said crop engaging elements by said stripping means, said supplemental stripper means extends transversely below said floor in the vicinity of said floor roll and includes means for guiding said subsequently engaged material to said conveying means on said floor roll.

15. In a round baler as set forth in claim 14 wherein said floor includes an end portion adjacent said transverse opening and in the vicinity of said floor roll, and said supplemental stripping means is affixed to said end portion to provide support for said floor.

16. In a round baler as set forth in claim 14 wherein said supplemental stripping means includes a like plurality of longitudinal openings and said fingers pass in close proximity to the edge of said like plurality of longitudinal openings under conditions where said tips have already traveled through said floor from said upper portion of said path to said lower portion causing said material not stripped from said fingers by said stripping means to be stripped therefrom by said supplemental stripping means.

\* \* \* \* \*